United States Patent [19]
Townsend et al.

[11] Patent Number: 4,972,548
[45] Date of Patent: Nov. 27, 1990

[54] ENCASED PRODUCT AND METHOD AND APPARATUS FOR ENCASING SAME

[75] Inventors: Ray T. Townsend, Des Moines; David W. Smith, West Des Moines; Robert M. Dykes, Urbandale, all of Iowa

[73] Assignee: Townsend Engineering Company, Des Moines, Iowa

[21] Appl. No.: 512,463

[22] Filed: Apr. 23, 1990

Related U.S. Application Data
[62] Division of Ser. No. 333,996, Apr. 4, 1989.

[51] Int. Cl.$^5$ .............................................. A22C 13/00
[52] U.S. Cl. .................................... 426/138; 53/550; 138/129; 452/32
[58] Field of Search ....................... 17/34, 49, 33, 1 F; 426/105, 138, 277, 140, 284; 53/550, 581, 227; 138/129

[56] References Cited
U.S. PATENT DOCUMENTS

| | | | |
|---|---|---|---|
| 2,575,467 | 11/1951 | Reichel et al. | 17/33 |
| 3,238,951 | 3/1966 | Silberman | 493/299 X |
| 4,543,282 | 9/1985 | Hammer et al. | 426/105 |
| 4,664,861 | 5/1987 | Pritikin et al. | 426/105 |
| 4,688,299 | 8/1987 | Frey et al. | 17/41 |
| 4,889,751 | 12/1989 | Hansen et al. | 426/105 |

Primary Examiner—Willis Little
Attorney, Agent, or Firm—Zarley McKee, Thomte, Voorhees & Sease

[57] ABSTRACT

The encased product of the present invention comprises an elongated flexible casing cylindrically shaped substantially along its length and having opposite end closures. A product material fills the cavity formed by the flexible casing and maintains the casing in a cylindrical shape. The cylindrical casing is formed from an elongated strip of flexible material having opposite side edges, the strip being formed into a finished tubular casing with the side edges of the strip within each casing frictionally overlapping and engaging the side edges thereof. The product is formed by continuously applying an elongated flexible ribbon to the outer cylindrical surface of a stuffing tube at a canted angle with respect to the longitudinal axis of the tube and rotating the flexible ribbon at the point where it is applied to the stuffing tube so that it will wrap around the tube in a plurality of helical revolutions to form a cylindrical casing on the tube. The adjacent edges of the helical revolutions of the ribbon are frictionally overlapped to one another so as to form a cylindrical casing and product is forced through the tube from the rearward end to the discharge end and into the cylindrical casing. The stuffing tube may be a rotating stuffing tube or it may be a stationary stuffing tube. A ribbon feed device is provided for feeding a continuous strip of ribbon to the stuffing tube. Moisture is applied to the ribbon to enhance the cohesiveness of the overlapped side edges thereof.

4 Claims, 6 Drawing Sheets

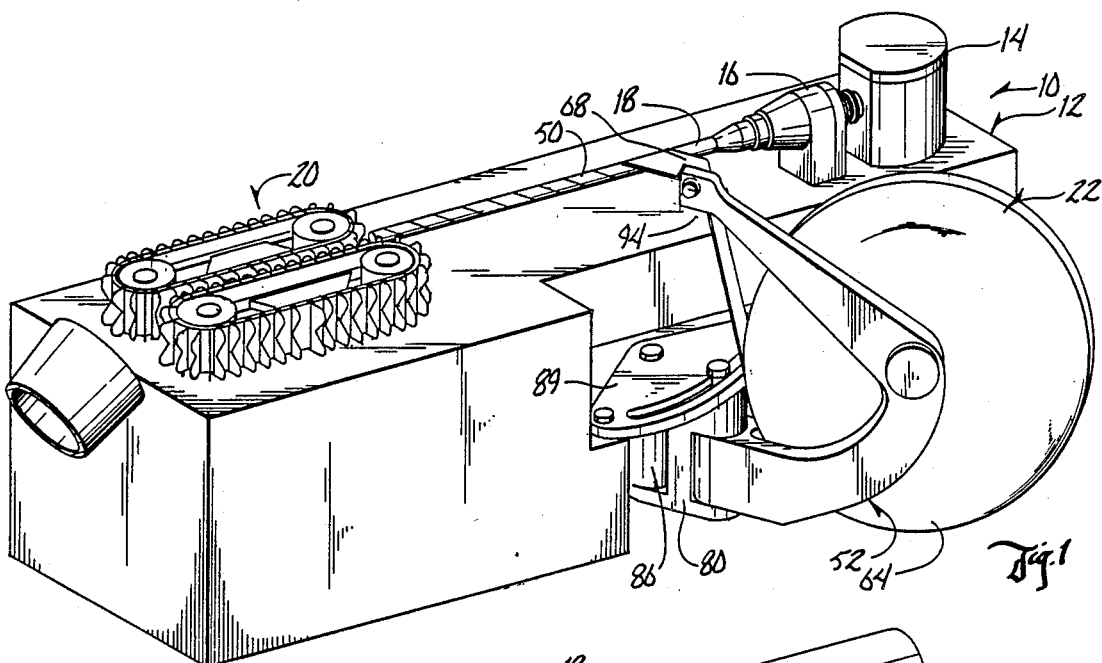
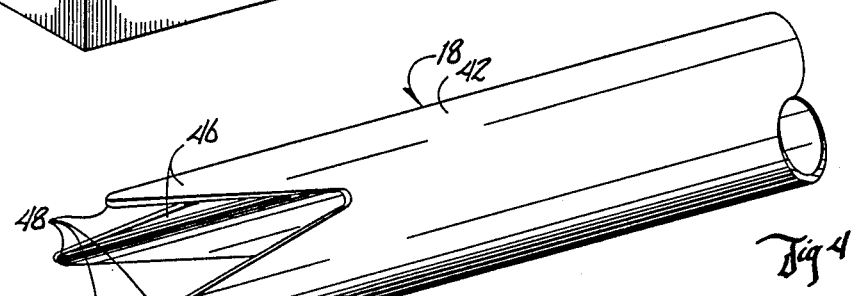
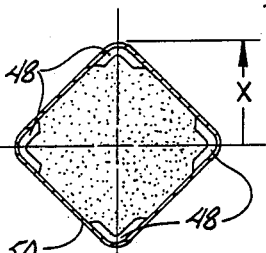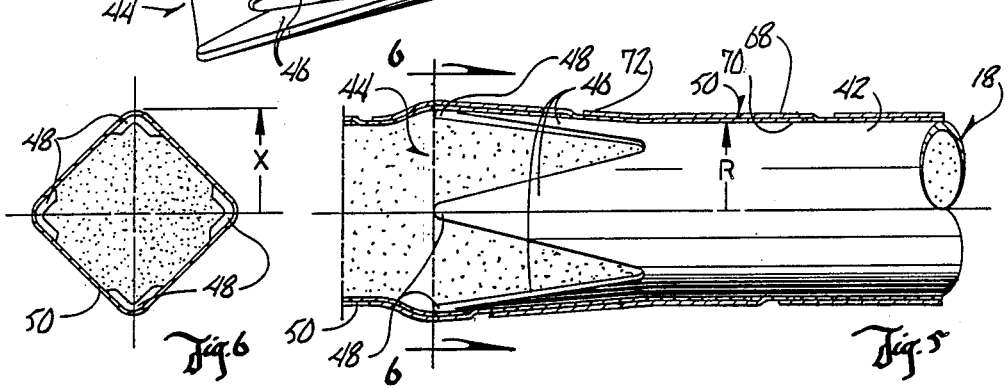

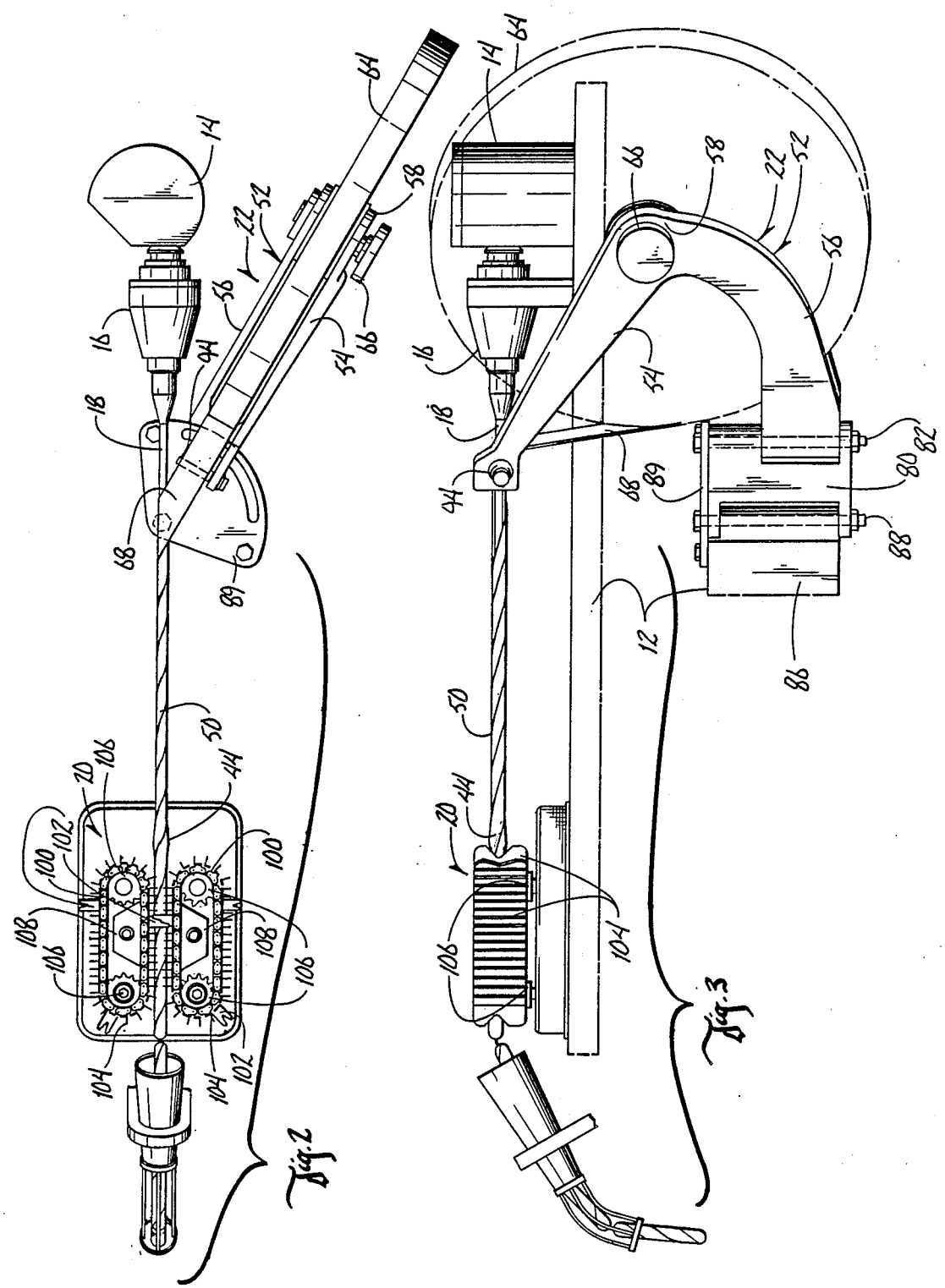

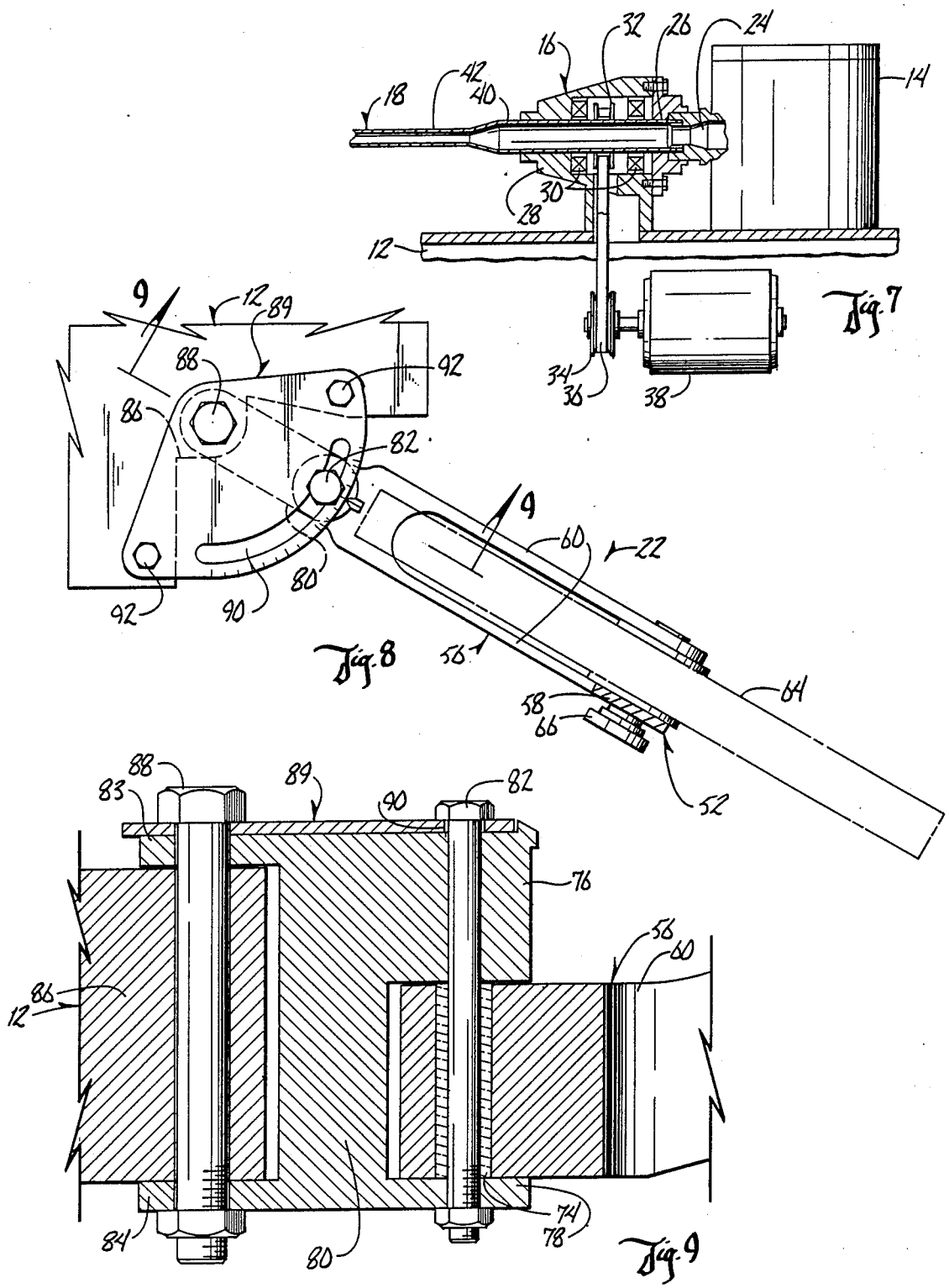

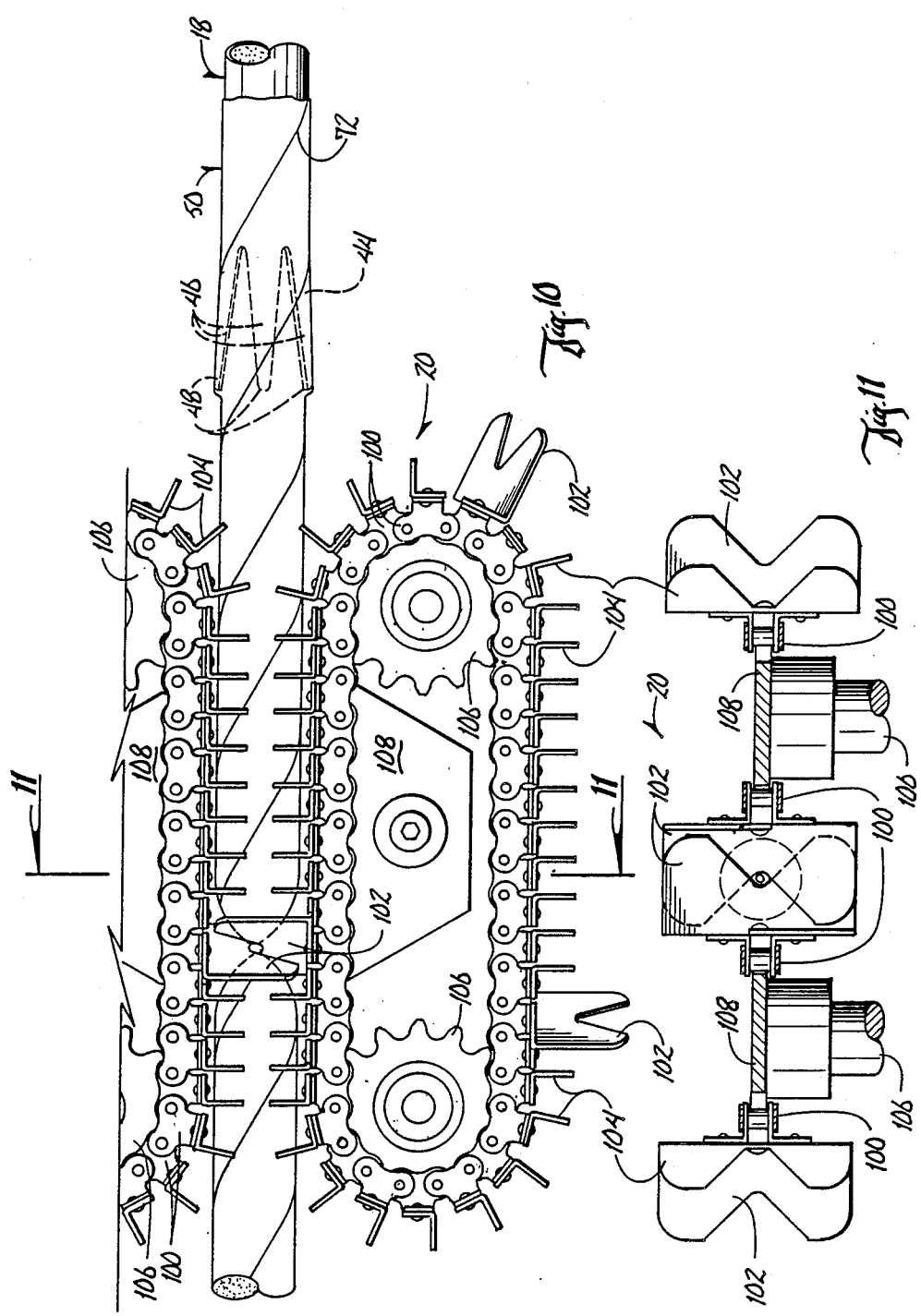

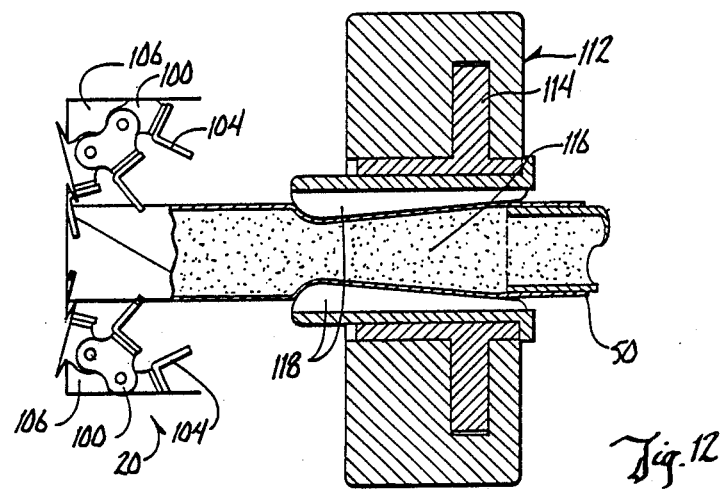
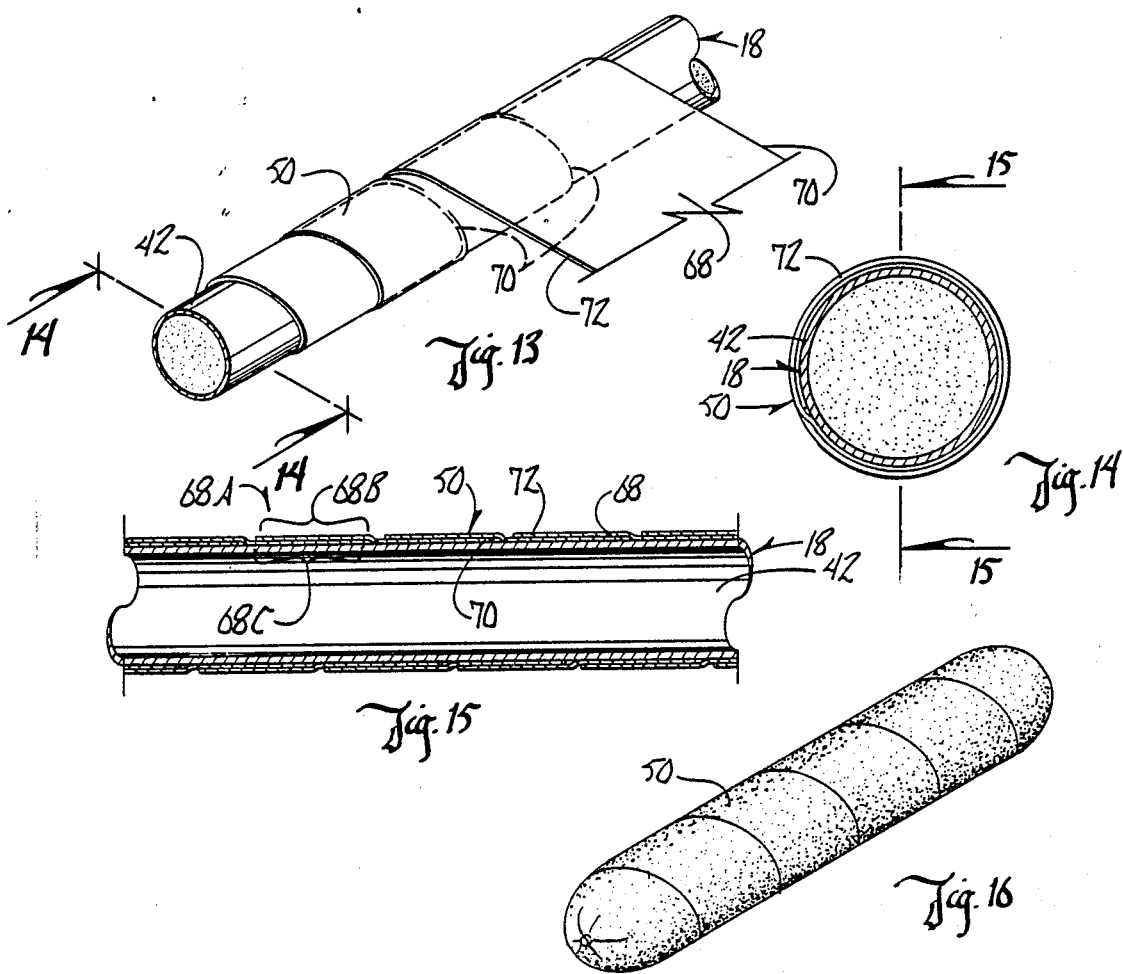

ENCASED PRODUCT AND METHOD AND APPARATUS FOR ENCASING SAME

This is a divisional of copending application Ser. No. 333,996 filed on Apr. 4, 1989.

BACKGROUND OF THE INVENTION

This invention relates to an encased product and method and apparatus for encasing same.

Presently known product encasing devices include a stuffing tube, a pump for pumping plastic product through the stuffing tube, a rotary chuck in front of the discharge end of the stuffing tube, linking apparatus for linking the filled casing, and looping apparatus for arranging the links in loops. As an addition to the use of a rotary chuck, some devices utilize a rotating stuffing tube which imparts rotation to the stuffed casing prior to the time that the casing is linked in the linking apparatus.

In these prior devices, a tubular casing is compressed in accordian-like fashion over the stuffing tube and includes one unfolded end protruding beyond the discharge end of the stuffing tube. As the product issues from the discharge end of the stuffing tube, it fills the portion of the casing protruding beyond the end of the stuffing tube, thereby filling the casing and propelling it away from the discharge end of the tube so that additional portions of casings will be unfolded and carried beyond the end of the tube.

The casings for making skinless franks, as well as edible casings for other kinds of sausage, are presently made in a tubular shape prior to being fitted over the end of the stuffing tube. Because of this tubular shape, it is difficult to treat the casing from both sides of the casing material. Also, in order to permit a substantial length of casing to be mounted on the tube, it is necessary to shirr the casing (wrinkle the casing so that it condenses into a short length) into a stick form so that a considerble length of casing can be placed on the horn, usually up to 100 feet or more. This shirring process is expensive and time-consuming, and the casing is bulky and in a fragile condition for shipping. During the stuffing and linking process these sticks or shirred casings are placed on a stuffing horn and rotated at a substantial speed to facilitate twisting of the casing at intervals after it has been filled in order to form links.

The above described method for placing the casing on the stuffing tube in shirred form, also has the disadvantage that the length of casing is somewhat limited. As each length of casing has been used up, it is necessary to shut down the machine so that an additional stick of shirred casing can be fitted over the stuffing tube.

It has been known that casings could be produced in a flat ribbon form and supplied in rolls which are thousands of feet in length. However, there has heretofore not been a convenient means for applying this casing to the stuffing tube in a form that will provide a cylindrical casing. This has been impractical prior to the present invention because the casing must be rotated in order to form a twisted link. Prior to the invention of application Ser. No. 644,218, filed Aug. 24, 1984, no practical means has been provided for applying the ribbon of casing to the stuffing tube, while at the same time permitting the casing to be rotated for forming the twisted link. However, the adhesive used in that invention and applied to the edges of the helically formed ribbon material, requires a very delicate and difficult operation.

Therefore, a primary object of the present invention is the provision of an improved encased product and method and apparatus for encasing same.

A further object of the present invention is the provision of an apparatus that will form a flat ribbon of casing material into a cylindrical casing while at the same time permitting the cylindrical casing to be filled with product, rotated and twisted into a plurality of sausage links, wherein the use of an adhesive on the ribbon is not required.

A further object of the present invention is the provision of an apparatus which will permit the forming of an elongated ribbon of casing material into a plurality of helical revolutions with the side edges of the ribbon within each one of the helical revolutions engaging and overlapping the side edges of the adjacent helical revolutions of the ribbon so as to form a cylindrical casing through the combined effect of inherent cohesiveness of the overlapped ribbon and the outward pressure of the material placed in the casing.

A further object of the present invention is the provision of apparatus which comprises a casing feed means which can be adjusted so as to change the angle of the helical revolutions at which the casing is wrapped around the stuffing tube.

A further object of the present invention is the provision of apparatus which will permit the formation of a cylindrical casing on a stuffing tube from a continuous strip of casing material regardless of whether or not the stuffing tube is stationary or rotating.

A further object of the present invention is the provision of apparatus which includes a stationary casing feed means, means for rotating the casing after it is filled, and linking means which grasps the rotating filled casing and permits the casing to twist and form a link.

A further object of the present invention is the provision of apparatus wherein the forward speed of the tubular casing is controlled by the linking mechanism and the rotating speed of the tubular casing determines the lateral or transverse movement of the casing ribbon.

A further object of the present invention is the provision of apparatus wherein the rotational speed of the casing and the longitudinal speed of the casing may be manipulated to product a tubular casing of desired diameter and rotational speed so as to result in the desired number of helical revolutions of casing strip within each link and so as also to provide the desired length of sausage.

A further object of the present invention is the provision of apparatus which will reduce the cost of casings for forming sausage links.

A further object of the present invention is the provision of a method and an apparatus which will permit the forming of an elongated ribbon of casing material with the side edges thereof engaging and overlapping to form a cylindrical casing through the combined effect of inherent frictional cohesiveness of the overlapped ribbon and the outward pressure of the material placed in the casing wherein the cohesiveness is enhanced by the humidity or dampness of the ribbon.

A further object of the present invention is to provide a means for applying moisture to the ribbon as the ribbon is introduced into the product encasing machine.

A further object of the present invention is to provide a sealed cartridge containing ribbon to be used for encasing the product wherein a predetermined amount of humidity or moisture is imposed on the ribbon in the sealed cartridge wherein the humidity is maintained until the cartridge is opened for use in conjunction with the product encasing machine.

SUMMARY OF THE INVENTION

The present invention utilizes a product pump, a stuffing tube connected to the product pump, and linking means beyond the discharge end of the stuffing tube. In addition, a casing feed apparatus is mounted adjacent the stuffing tube, and is adapted to provide a flat ribbon form of casing material to the stuffing tube. The stuffing tube may be stationary or may be a rotatable stuffing tube. In the case of the stationary stuffing tube, additional means such as a rotating chuck are provided for rotating the casing after it is filled prior to the time that it reaches the linking apparatus. This rotational movement is supplied by the rotating stuffing tube in the case of a machine having a rotatable stuffing tube.

The casing ribbon is mounted on a casing feed apparatus which may be in the form of a rotating reel or other suitable form. The ribbon is fed from the reel onto the outer surface of the stuffing tube at an angle which is canted with respect to the longitudinal axis of the stuffing tube. The casing wrapped around the outer surface of the stuffing tube is rotated either by the rotating stuffing tube (in the case of a rotatable stuffing tube), or by other suitable means such as a rotating chuck (in the case of a stationary stuffing tube).

A product pump forces a product material through the stuffing tube and into the casing at the discharge end of the stuffing tube. This pulls the casing from the end of the stuffing tube and propels it toward the linking apparatus. Continuous actuation of the product pump causes the casing to be pulled off the end of the stuffing tube continuously and consequently cause the casing ribbon to be pulled continuously from the ribbon feed apparatus.

The ribbon feed apparatus introduces the ribbon to the outer surface of the tube at an angle canted with respect to the longitudinal axis of the tube. The rotating tube in the case of a rotatable tube (or the rotating chuck in the case of a stationary tube) causes the ribbon to be wrapped around the outer surface of the tube in a plurality of helical revolutions. The angle of the introduction of the ribbon to the tube and the width of the ribbon are chosen so that the edges of the ribbon overlap one another within the helical revolutions, thereby forming an elongated cylindrical casing. The overlapped edges of the casing strip are adhered to one another only by the inherent cohesiveness of the overlapped portions of the casing material and the pressure of the product to be encased so as to form a unitary cylindrical casing.

The preferred embodiment of the ribbon feed means comprises a reel mounted to a reel support frame for pivotal movement about both a horizontal axis and a vertical swivel axis. The reel is free to swivel freely about the vertical swivel axis so as to permit the reel to align itself with respect to the stuffing tube at a predetermined angle in response to the pulling of the ribbon from the reel. The angle of the reel with respect to the longitudinal axis of the stuffing tube may be altered by swinging the reel support frame about a second vertical axis with respect to the machine frame and by securing the reel support frame in a stationary position when the desired angle is achieved.

The stuffing tube shown in the present invention is of unique construction in that the discharge end of the stuffing tube has a plurality of radially outwardly extending fingers thereon. These outwardly extending fingers terminate in finger ends which engage the interior surface of the casing at a plurality of points. The distance between the finger ends is such that the casing is not stretched beyond its normal cylindrical circumference, but instead is deformed into a shape which in cross-section appears approximately in the form of a polygon with each of the fingers providing an apex of the polygon. These outwardly extending fingers provide a retarding effect or drag on the longitudinal movement of the casing as it is drawn off of the discharge end of the stuffing tube. This drag is important to insure the proper filling of the casing uniformly along the length of the casing.

The present invention utilizes a stationary mounting for the reel holding the casing ribbon, and still permits the casing to be rotated at the end of the stuffing tube so as to form the twisted links. In the case of a stationary stuffing tube, a rotating chuck or other means are provided adjacent the outlet end of the horn or tube for rotating the tubular portion of the casing at the proper speed to provide the desired number of twists per link. In the case of a rotating stuffing tube, the rotating tube itself imparts rotation to the casing on the tube.

Beyond the end of the stuffing tube is a linking device that pinches the casing together at controlled intervals to determined exactly where the twist will be established in the tubular casing as well as to space the distance between the links to determine the length of the sausage links.

The forward speed of the formed and filled tubular casing is controlled by the linking mechanism while the rotating speed of the tubular casing determines the speed at which the casing ribbon is drawn off of the ribbon feed means. By manipulating these two speeds, and by using the correct width of the ribbon, it is possible to produce a tubular casing of a desired diameter that is rotating at the proper speed so as to produce the number of twists desired per link and also so as to produce the desired length of sausage. These two motions combined together determine the angle at which the ribbon is applied to the horn. The free wheeling swivel mounting of the casing feed means allows the roll of casing to automatically swivel about a vertical swivel axis and follow the desired angle.

All of the foregoing aspects of the invention are shown in the above three identified prior patents. The novelty of the instant invention is the application of sufficient humidity and moisture to the casing material to enhance the frictional cohesiveness of the overlapped portions thereof. The desired humidity can be imposed on the casing or ribbon material either at the time the material is introduced into the product encasing machine, or at the time of manufacture of the casing material wherein the casing material is placed in sealed cartridges to maintain the desired level of humidity until the time of usage.

BRIEF DESCRIPTION OF THE FIGURES OF THE DRAWINGS

FIG. 1 is a perspective view of the apparatus of the present invention.

FIG. 2 is a top plan vies of the present invention.

FIG. 3 is a front elevational view of the present invention.

FIG. 4 is an enlarged perspective detail of the end of the stuffing tube.

FIG. 5 is a detailed sectional view showing the arrangement of the casing on the end of the stuffing tube.

FIG. 6 is a sectional view taken along line 6—6 of FIG. 5.

FIG. 7 is an enlarged sectional detail showing the inlet end of the stuffing tube.

FIG. 8 is a top plan view of the casing feed apparatus.

FIG. 9 is a sectional view taken along line 9—9 of FIG. 8.

FIG. 10 is an enlarged detail plan view of the discharge end of the stuffing tube and the linking means.

FIG. 11 is a sectional view taken along line 12—12 of FIG. 11.

FIG. 12 is a view similar to FIG. 10, but showing a modified form of the invention.

FIG. 13 is a partial perspective view of a portion of the stuffing tube as the ribbon material is being wound thereon.

FIG. 14 is a transverse sectional view taken on line 14—14 of FIG. 13.

FIG. 15 is a longitudinal sectional view taken on line 15—15 of FIG. 13.

FIG. 16 is a perspective view of a finished link of encased material.

DETAILED DESCRIPTION OF THE PREFERRED EMBODIMENT

Figure 17:
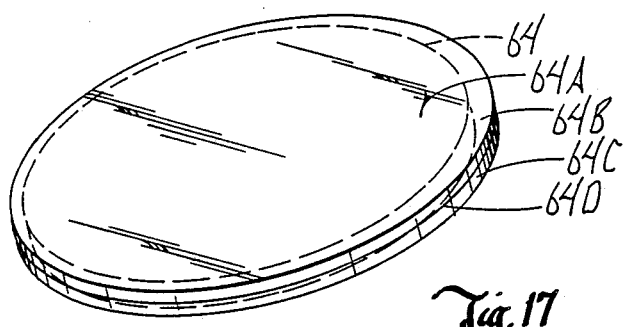
FIG. 17 is a perspective view of a sealed cartridge containing the ribbon material of this invention.

Referring to FIG. 1, the numeral 10 generally designates the stuffing and linking machine of the present invention. Machine 10 comprises a table or housing 12 having mounted on its upper surface a product pump assembly 14, a tube support assembly 16, a stuffing tube or horn 18, and a linking apparatus 20. Also mounted to table 12 is a casing ribbon feed assembly 22.

Referring to FIG. 7, product pump 14 is of conventional construction and therefore the details are not shown. Pump 14 includes an outlet 24 which is in communication with the inlet end 26 of stuffing tube 18. Tube support assembly 16 includes a housing 28 which is mounted on the upper surface of table or housing 12 and which includes a plurality of bearings 30 which support stuffing tube 18 and which provide rotatable mounting of stuffing tube 18 for rotation about a horizontal axis. A belt pulley 32 is mounted on stuffing tube 18 within housing 28. Trained around belt pulley 32 and around an additional motor pulley 34, is a drive belt 36. Motor pulley 34 is driven by a motor 38 so as to cause rotation of stuffing tube 18 about its longitudinal axis.

Stuffing tube 18 includes an enlarged diameter portion 40 adjacent its inlet end 26, and also includes an elongated reduced diameter portion 42 extending from enlarged portion 40 to the discharge end 44 of stuffing tube 18 (FIG. 4).

As can be seen in FIGS. 4 and 5, the discharge end 44 is provided with a plurality of fingers 46, each of which is flared radially outwardly to a finger tip 48. In the configuration shown in FIGS. 4 and 5, there are four fingers 46, but more or less fingers can be utilized without detracting from the invention.

As can be seen in FIGS. 6, each of the finger tips 48 engage the interior surface of the casing 50 so as to cause the casing to have a substantially polygonal shape (in the case of the configuration shown in FIGS. 4 and 5, a square shape), rather than the circular cross-sectional shape which occurs around the reduced diameter portion 42 of stuffing tube 18. The outward flaring of tips 48 is chosen so that the tips do not deform or stretch the casing from its original natural shape attained by virtue of surrounding the stuffing tube 42. That is, the circumference of the casing 50 when it is engaged by finger tips 48, is the same and is not enlarged from the circumference of the casing 50 when it is surrounding the reduced diameter portion 42 of stuffing tube 18. Referring to FIG. 6, the dimension X represents the distance from the cross-sectional center of the stuffing tube to the outwardly tapered tips 48. If this distance X is chosen to be approximately 1.11 times the radius of the stuffing tube at reduced diameter portion 42, the result will be a deformation of the circular shape of the casing by fingers 48 without stretching or enlarging the circumference of the casing.

The result of the above configuration of outwardly flared fingers 46 is that a longitudinal drag is imparted to the casing so as to counteract the forward propelling motion imparted by the product exiting from the outward discharge end 44 of stuffing tube 18.

Casing ribbon feed assembly 22 is comprised of an elongated elbow frame 52 having an upper frame member 54 and a lower frame member 56 which are joined at an elbow 58. Upper frame member 54 is singular is construction. Lower frame member 56 is comprised of a pair of spaced apart arms 62. Spaced apart arms 62 and upper frame member 54 are joined to one another at elbow 58.

Rotatably mounted between spaced apart arms 62 is a casing reel 64 which is supported at elbow 58 by means of an axle pin 66 which extends through the center of reel 64. Pin 66 provides rotational mounting of reel 64 about a horizontal axis.

Wrapped around reel 64 is an elongated casing ribbon 68 which is flat and which includes opposite lateral edges 70, 72 (FIG. 13). Ribbon 68 is a cellulose material commonly used in sausage encasement. The thickness thereof is approximately 0.0012 inches and the width can vary, but a width of one to four inches is satisfactory.

The lower end of lower frame member 56 includes a vertically oriented bushing 74 (FIG. 9) which is positioned between two vertically spaced jaw members 76, 78 of a swing block 80. A pivot pin or bolt 82 extends downwardly through upper and lower jaws 78 and also through bushing 74 so as to provide pivotal mounting of elbow frame 52 about a vertical axis. As can be seen in FIG. 8, the length of bushing 74 is slightly greater than the thickness of lower frame member 56 so that frame member 56 will pivot freely about bushing 74 without binding against the upper and lower spaced apart jaws 76, 78.

Swing block 80 includes also a pair of spaced apart flanges 83, 84 which embrace a support block 86 rigidly mounted to table or housing 12. Swing block 80 is pivotally mounted to support block 86 by means of a bolt or pin 88 which extends through flanges 83, 84 and also extends through support block 86. Thus, swing block 80 is free to swing about the vertical axis provided by pin 88.

Rigidly mounted to the upper surface of support block 86 is an adjustment plate 89. Plate 89 is held against movement with respect to block 86 by means of bolts 92 and also by means of pin 88 which extends through plate 89.

Plate 89 includes an arcuate slot 90 therein which extends along a curve which is concentric to the pivotal axis provided by pin 88. Bolt 82 extends through slot 90 and thence downwardly through jaw members 76, 78 and bushing 84. When bolt 82 is tightened, it holds swing block 80 against pivotal movement about axis 88, while at the same time permitting elbow frame 52 to pivot freely or swivel freely about the vertical axis provided by pin 82. When it is desired to swing block 80 about axis 88, all that is necessary is to loosen bolt 82 and pivot the swing block 80 about pin 88 to the desired position. Bolt 82 is then tightened and the swing block 80 is held against further swinging movement.

Mounted on the upper end of upper frame member 54 is a ribbon support pin 94 (FIGS. 2 and 3). Pin 94 provides a sliding support surface for the ribbon 68 as it is pulled off of reel 64.

The free end of the ribbon as it passes off of reel 64 passes upwardly over pin 94 and then is wrapped around the stuffing tube 18 in a helical fashion so as to form an elongated cylindrical casing designated by the numeral 50. With reference to FIG. 15, each helix 68A comprises overlapped portions 68B and 68C. The amount of overlapping can vary, but is needs to be sufficiently great that the helixes 68A will not separate upon being filled with material. Overlapping equal to one-half the width of ribbon 68 is more than sufficient.

As can be seen in FIGS. 2 and 3, pin 94 is positioned forwardly of swivel pin 82. This arrangement places reel 64 and pin 94 on opposite sides of the swivel axis provided by pin 82. When ribbon 68 is pulled over pin 94 it causes the entire frame 52 to swivel freely about swivel pin 82 so as to self align the reel 64 with the angle of the ribbon helixes being formed on the stuffing tube.

The linking mechanism 20 is of conventional construction and includes a pair of rotating linking chains 100 having a plurality of V-shaped pinching members 102 and a plurality of V-shaped holding members 104 thereon. Chains 100 are mounted on spaced apart sprockets 106 and a pair of holding brackets 108 are positioned to hold the chains in spaced apart relationship so as to provide a link path 110 therebetween for receiving the rotating casing 50 from the discharge end of the stuffing tube 18 and for forming twisted links from the filled casing in conventional fashion.

The modification shown in FIGS. 1-12 includes a rotating stuffing tube 18. However, the present invention may also be utilized in combination with a stationary stuffing tube. FIG. 12 illustrates a modified form of the invention, wherein a stationary stuffing tube 110 includes adjacent its discharge end a rotating chuck assembly 112. Chuck assembly 112 is similar to rotating chucks presently used in product encasing machines. It includes a rotatable driven member 114 having a longitudinal chuck opening 116 with a plurality of flutes 118 protruding radially inwardly therefrom. Flutes 118 are adapted to engage the outer surface of the casing after it has been filled by product issuing from the discharge end of stuffing tube 110. The rotatable member imparts a rotation to the filled casing so that the casing is rotating at the time it is engaged by the linking mechanism 20.

The operation of the device shown in FIGS. 1-11 is as follows: The operator first determines the angle at which he wants the strip 68 to engage the stuffing tube 18. This is accomplished by loosening bolt 82 and pivoting swing block 80 within arcuate slot 92 to the desired angle. Bolt 82 is then tightened so as to prevent further movement of swing block 80. The free swiveling mounting of elbow frame 52 about pin 82 permits the reel 64 to swivel freely about the vertical axis of pin 82. This permits the reel 64 to self align by the action of the ribbon being pulled off the reel.

After choosing the correct setting for swing block 80, the operator pulls the loose end of ribbon 68 upwardly over pin 94 as shown in FIGS. 3 and 4. He then wraps the casing around the stuffing tube 50 in helical fashion as shown in FIG. 2 until a portion of the casing is protruding beyond the discharge end of the stuffing tube. As the operator pulls the ribbon off of reel 64, the overlapping portions 68B and 68C tend to fricitonally adhere to each other to maintain the construction of the casing 50. Thus, when the ribbon is wrapped around stuffing tube 18, the lateral edges 70, 72 overlap and engage and frictionally adhere to one another and cause the ribbon to be formed into an elongated cylindrical casing designated by the numeral 50 in the drawings.

The operator next turns the machine on, causing the product pump 14 to force product through the stuffing tube and simultaneously causing the stuffing tube 18 to rotate. As the stuffing tube rotates, the friction between the stuffing tube and the cylindrical casing 50 causes the cylindrical casing 50 to rotate in unison with the stuffing tube. The product being pumped through the stuffing tube exits through the discharge end of the stuffing tube and fills the casing which is protruding beyond the stuffing tube so as to form a filled link which is engaged by the linking mechanism in conventional fashion as shown in FIGS. 10 and 11. The filling of the casing exerts an outward force against the helixes 68A and causes the overlapping portions 68B and 68C to more firmly engage and to fricitonally adhere together.

The flared finger tips 48 engage the interior surface of the casing as it is being pulled off the discharge end of the stuffing tube, and provide a retardation or drag on the axial movement of the casing. This permits the casing to be at least partially filled prior to the linking operation. The lateral speed of the linking apparatus provides a final degree of filling as desired. The flared finger tips 48 also facilitate the rotation of the casing 50 in response to rotation of the stuffing tube.

The rotation of the stuffing tube and the axial movement of the cylindrical casing 50 from the discharge end of the stuffing tube causes the ribbon 68 to be continuously drawn off of reel 64 and wrapped helically around stuffing tube 18.

Because elbow frame 52 is permitted to swivel freely about the vertical axis of bolt 82, the reel 62 is permitted to align itself in a straight line with respect to the line between pins 82, 88.

If it is desired to change the location at which the ribbon is introduced to the rotating stuffing tube 18, the operator merely loosens bolt 82 and swings swing block 80 to the desired position. This will change the location of the reel relative to the stuffing tube so that the point at which the ribbon beings wrapping around the tube is also changed.

The angle of attack of ribbon 68 and the width of ribbon 68 are chosen so that the edges of the ribbon are adjacent or overlapping when wrapped around stuffing tube 18.

The result of the above construction is that the roll of casing is mounted on casing ribbon feed assembly 22 which is stationary with respect to the stuffing tube. At the same time, the present invention provides a rotating casing 50 at the end of the horn which is necessary in order to form the twisted links in combination with the linking mechanism 20.

The forward speed of the formed tubular casing 50 is controlled by the linking mechanism and by the speed at which the pump assembly 14 forces product from the end of the stuffing tube. The rotating speed of the tubular casing determines the lateral or transverse movement of the casing ribbon. Therefore, by manipulating these two speeds, and by using the correct width of ribbon, it is possible to achieve the desired angle of attack of the ribbon and to produce a tubular casing of desired diameter that is rotating at the proper speed to provide the desired number of twists per link and the desired length of each link.

In the modification shown in FIG. 12, the stuffing tube 110 is stationary and does not have a flared end. However, the rotation of the casing is provided by the rotating chuck assembly 112, which engages the filled casing adjacent the discharge end of the stuffing tube. This causes the casing to rotate on the stuffing tube, thereby producing the same effect of pulling the ribbon 68 off of feed assembly 22 and forming the helical convolutions which make up the cylindrical casing 50.

Thus, it can be seen that the present invention may be utilized with both a stationary stuffing tube or a rotating stuffing tube.

FIG. 17 shows an alternate form of the invention including a housing or cartridge 64A comprised of housing parts 64B and 64C sealed by any convenient means along seal line 64D. Cartridge 64D contains cartridge 64 wherein the ribbon 68 thereon has the desired level of humidity or moisture imposed thereon at the time of manufacture. The ribbon 68 is then sealed in cartridge 64D to maintain the moisture level in the ribbon until the ribbon is used as shown in FIGS. 1, 2, and 3.

Figure 18:
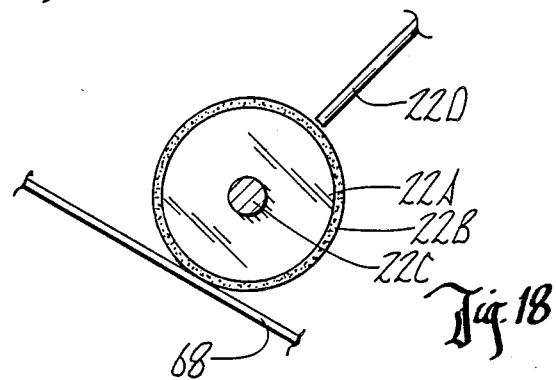
FIG. 18 is a partial elevational view showing means for applying moisture to the ribbon or casing material as such material is being introduced into a product encasing machine.

FIG. 18 shows an attachment that can be made to the machine of FIGS. 1, 2 and 3 wherein humidity or moisture can be added to the ribbon 68 at the time that it is introduced into the product encasing machine. A roller 22A is mounted by any convenient means to the machine adjacent ribbon 68.

Roller 22A has a sponge-like material 22B secured to the outer surface and is mounted on a center rotational support 22C. The surface of the sponge-like material 22B is adapted to engage ribbon 68 as it emerges from reel 64 as shown in FIGS. 1, 2 and 3. A liquid or water-like supply tube 22D connected to a controlled sourced of liquid terminates adjacent the periphery of material 22B to deposit liquid on material 22B for subsequent deposit on ribbon 68. The liquid can be water or a water-based non-adhesive fluid.

The amount of moisture, or moisture content, to be imposed on ribbon 68 will vary depending on the precise material thereof. However, sufficient dampness must exist to permit the overlapping edges of the ribbon to experience sufficient frictional cohesiveness to maintain the casing strip in a self-contained tubular casing to contain a plastic product. The roller 22A can engage either the whole ribbon 68, or only the side edges which are overlapped.

Ribbon 68 can be comprised of conventional casing material such as cellulose hydrate, collagen or synthetic intestines which can be made, for example, of polyamide or polyester. Cellulose hydrate casings are produced by coagulating viscose and regenerating the cellulose, they contain plasticizers, such as glycerol. While these conventional casings do typically contain water content of from 6% to 15%, they may contain water content of about 25% or higher. The water content of conventional casings, which all are in tubular form, have nothing to do with forming these conventional casings. (See. U.S. Pat. No. 4,505,093, at Col. 5, commencing at line 15).

Further, some conventional casings have a layer on the outside thereof which is impermeable to water and water vapor which would prevent them from being used in the instant invention. This is because the moisture content of ribbon 68 is crucial to achieving the frictional adhesion of the ribbon as the casing is being formed.

Accordingly, the ribbon 68 of this invention should have a moisture content of between 15% and 45%, and preferably between the range of 20% and 40% (by weight). If the moisture content is below 15%, the adhesion is very poor or nonexistent. If the moisture content is above 45%, the casing is too wet and the moisture defeats the adhesion process by lubricating the surface of the ribbon.

Thus, it is seen that this invention will achieve at least all of its stated objectives.

What is claimed is:

1. A cartridge for containing the ribbon for the casing of a meat encasing machine, comprising:
   an enclosed housing;
   a reel of ribbon material in said housing, said ribbon containing sufficient moisture on the side edges thereof so that said side edges will adhere to each other to create a self-contained tubular casing when placed in overlapping condition;
   the moisture content of said ribbon material being between 15% and 45% by weight.

2. The apparatus of claim 1 wherein the moisture content of said ribbon material is between 20% and 40% by weight.

3. The casing material for encasing a plastic product, comprising:
   an elongated length of ribbon material having opposite side edges,
   said ribbon material containing sufficient water-based moisture on the side edges thereof so that said side edges will adhere to each other to create a self-contained tubular casing when placed in overlapping condition,
   the water-based moisture content of said ribbon material being between 15% and 45% by weight.

4. The casing material for encasing a plastic product, comprising:
   an elongated casing strip having opposite side edges,
   said side edges being sufficiently damp from the presence of water-based moisture that when they are overlapped in a helical configuration to create a self-contained tubular casing to contain a plastic product, sufficient frictional cohesiveness between said overlapped edges will exist to maintain said side edges in fixed overlapping relation to maintain said tubular casing,
   the water-based moisture content of said ribbon material being between 15% and 45% by weight.

* * * * *